United States Patent [19]
Harada et al.

[11] Patent Number: 5,215,056
[45] Date of Patent: Jun. 1, 1993

[54] ENGINE SPEED CONTROL SYSTEM FOR A WORKING VEHICLE

[75] Inventors: Eriya Harada; Mikio Yuki; Masatsugu Tone; Masatake Murakawa; Ryozo Imanishi, all of Sakai, Japan

[73] Assignee: Kubota Corporation, Osaka, Japan

[21] Appl. No.: 877,539

[22] Filed: May 1, 1992

[30] Foreign Application Priority Data

Nov. 27, 1991 [JP] Japan .................. 3-312129

[51] Int. Cl.[5] .................. F02D 31/00; F02D 35/00; B60K 41/28
[52] U.S. Cl. .................. 123/339; 123/198; 123/352
[58] Field of Search .......... 123/198 D, 339, 350–356, 123/385, 400, 399; 56/10.5

[56] References Cited

U.S. PATENT DOCUMENTS

| | | | |
|---|---|---|---|
| 4,372,265 | 2/1983 | Kasiewicz | 123/352 |
| 4,638,779 | 1/1987 | Kitada | 123/385 |
| 4,643,146 | 2/1987 | Spriessler | 123/385 X |
| 4,779,591 | 10/1988 | Tordenmalm | 123/352 |
| 4,885,903 | 12/1989 | Scag | 56/10.8 |
| 4,898,137 | 2/1990 | Fujita et al. | 123/352 |

Primary Examiner—Tony M. Argenbright
Attorney, Agent, or Firm—Webb, Burden, Ziesenehim & Webb

[57] ABSTRACT

An engine speed control system for a working vehicle having an engine, and a propelling transmission and a power takeoff device driven by the engine. Engine speed is adjustable by an accelerator controlled by control signals outputted from a control unit. The control unit is connected to a clutch operation detecting switch for detecting an operative state of a power takeoff clutch for operating a power takeoff device and to a shift condition detecting switch for detecting a shift of the propelling transmission. The control unit outputs a control signal for rotating the engine at an idling speed when the propelling transmission is in neutral and the power takeoff clutch is disengaged, and a control signal for rotating the engine at a high rotating rate when the propelling transmission is in a drive transmitting position or the power takeoff clutch is engaged.

5 Claims, 3 Drawing Sheets

ENGINE SPEED CONTROL SYSTEM FOR A WORKING VEHICLE

BACKGROUND OF THE INVENTION

1. Field of the Invention

The present invention relates to an engine speed control system for a working vehicle, particularly a lawn mower, having an engine, and a propelling transmission and a power takeoff device driven by the engine.

2. Description of the Related Art

In an operational run of a working vehicle, e.g. a grass cutting run of a lawn mower, the engine normally is set to a maximum rotating rate or a rotating rate close thereto. That is, the vehicle is used in an operation with an accelerator fixed to a predetermined high speed position. The rotating rate of the engine is seldom changed during an ordinary operational run. Conventionally, therefore, such a working vehicle has a pivotable throttle lever manually operable by the driver to adjust engine speed to a predetermined value.

In the case of a lawn mower, a mower unit receives drive of the engine through a power takeoff device, and the drive transmission to the mower unit is controlled by a power takeoff clutch. When the mower unit is driven again (by engaging the power takeoff clutch) after an interruption of a grass cutting operation (disengagement of the power takeoff clutch) or when the engine is started again to resume a run after the lawn mower is stopped, the engine should desirably be set to a low rotating rate, e.g. idling speed, in order to assure a smooth operation.

However, engine speed is adjusted manually as noted above, and the adjusting operation is troublesome to the driver. In actual situations, the driver seldom lowers the engine speed and the engine is started in high speed conditions. Consequently, the engine will suddenly start rotating at high speed, and so will the cutting blades of the mower unit if the power takeoff clutch is engaged then. This is undesirable from the viewpoint of durability of mechanical components. In addition, an operation is started in an unsmooth way often accompanied by intense shocks.

SUMMARY OF THE INVENTION

The object of the present invention is to provide an engine speed control system for a working vehicle having an engine, and a propelling transmission and a power takeoff device driven by the engine, which system is operable to set a low engine speed upon detection of conditions of the vehicle where the low engine speed is desirable.

The above object is fulfilled, according to the present invention by an engine speed control system comprising:

clutch operation detecting means for detecting an operative state of a power takeoff clutch for operating the power takeoff device;

shift condition detecting means for detecting a shift of the propelling transmission;

engine speed adjusting means for adjusting rotating rate of the engine; and control means for receiving detection signals from the clutch operation detecting means and the shift condition detecting means, and outputting control signals to the engine speed adjusting means, the control means outputting a control signal for rotating the engine at an idling speed when the propelling transmission is in neutral and the power takeoff clutch is disengaged, and a control signal for rotating the engine at a high rotating rate when the propelling transmission is in a drive transmitting position or the power takeoff clutch is engaged.

When the propelling transmission is in a change speed position or drive transmitting state, the vehicle is either just moving from one place to another or running in a grass cutting operation. When the power takeoff clutch is engaged, the vehicle is engaging in a grass cutting operation. Therefore, when these conditions are met, it may be determined that the vehicle is driven in a grass cutting operation. In such a case, the engine may be set automatically to a high rotating rate suited to the operation. When the propelling transmission is in neutral or drive shut-off state, the vehicle is standing still. When the power takeoff clutch is disengaged, the vehicle is not engaging in a grass cutting operation. Therefore, when these conditions are met, it may be determined that the vehicle is at rest. In such a case, the engine may be set automatically to idling rotation suited to the resting condition.

That is, the respective detecting means and control means are operable to set the engine speed adjusting means automatically to an idling position when the engine may just be idling without necessity to output a high-rate drive, and to a high-rate position when a high-rate engine drive is required.

Consequently, necessary engine speed controls are effected automatically without a manual operation. The vehicle may now be started smoothly without shocks, which promotes durability of mechanical components such as the power takeoff clutch and engine. With a reduction of wasteful engine racing, noise and vibrations are diminished and fuel consumption is improved. Thus, the present invention provides a lawn mower of improved overall performance.

In a preferred embodiment of the invention, the control system further comprises driver detecting means for confirming presence of a driver on a driver's seat. The control means outputs a control signal for forcibly switching the engine to the idling speed when the presence of a driver on the driver's seat is unconfirmed. Thus, when the driver is not in an appropriate position for driving the vehicle, the engine is forcibly set to the idling speed even if the other conditions are met. This assures improved safety. Of course, the engine may be forcibly stopped in such a case.

Other features and advantages of the invention will be apparent from the following description of the preferred embodiment to be read with reference to the drawings.

DESCRIPTION OF THE PREFERRED EMBODIMENT

An embodiment of the present invention will be described with reference to the drawings.

Figure 1:
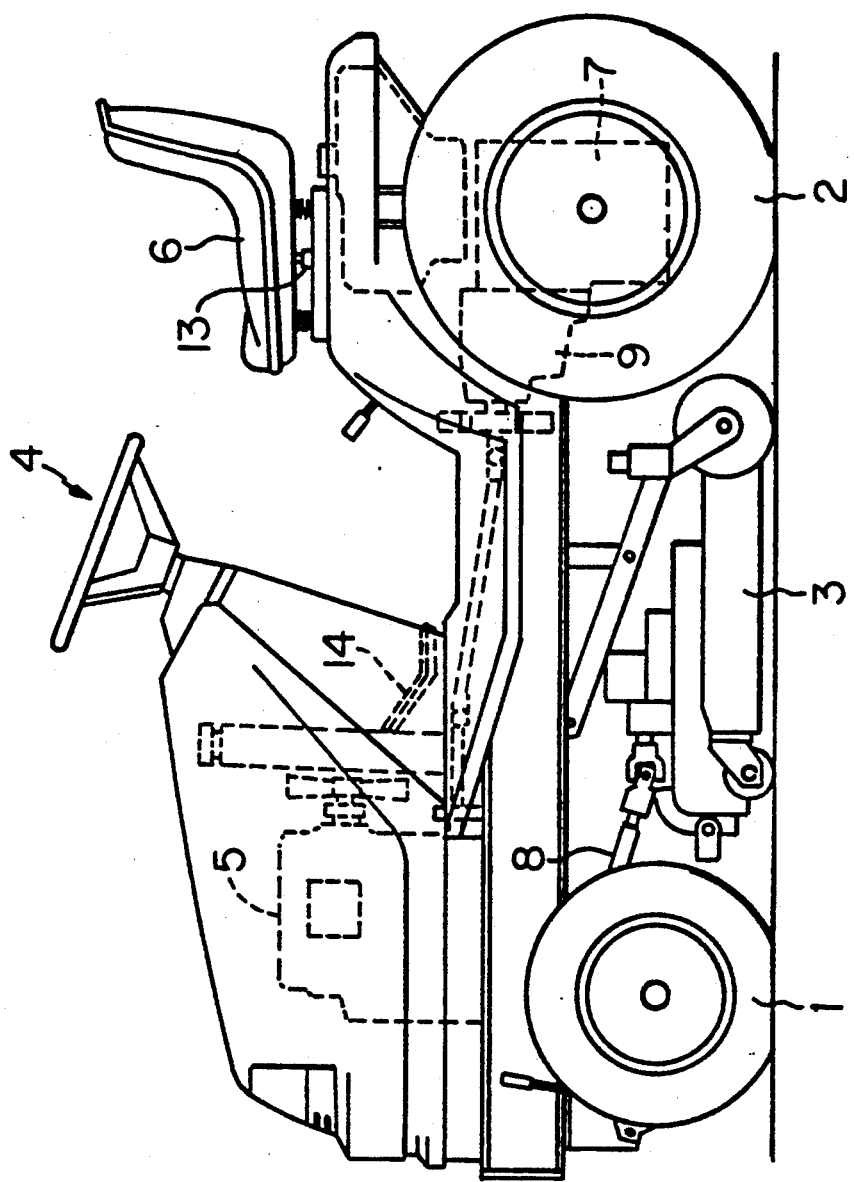
FIG. 1 is a side elevation of a lawn mower having an engine speed control system according to the present invention.

FIG. 1 shows a lawn mower equipped with an engine speed control system according to the present invention. The lawn mower includes front wheels 1, rear wheels 2, a mower unit 3, a driver's section 4, an engine 5, a driver's seat 6, a propelling transmission 7, and a power takeoff shaft 8 for transmitting drive from the engine 5 to the mower unit 3. A power takeoff clutch 10 is mounted in an intermediate position on the power takeoff shaft 8. Numeral 9 denotes a hydrostatic stepless transmission operable by a shift pedal 14 disposed adjacent a steering column. Though not shown in FIG. 1, an accelerator 11 is provided for setting a rotating rate of the engine 5. The construction noted above is conventional, and no more details are believed irrelevant to the gist of the present invention. It is to be noted, however, that this lawn mower further includes a pressure sensor 13 disposed under the driver's seat 6 to act as a seat switch for detecting a seated driver.

Figure 2:
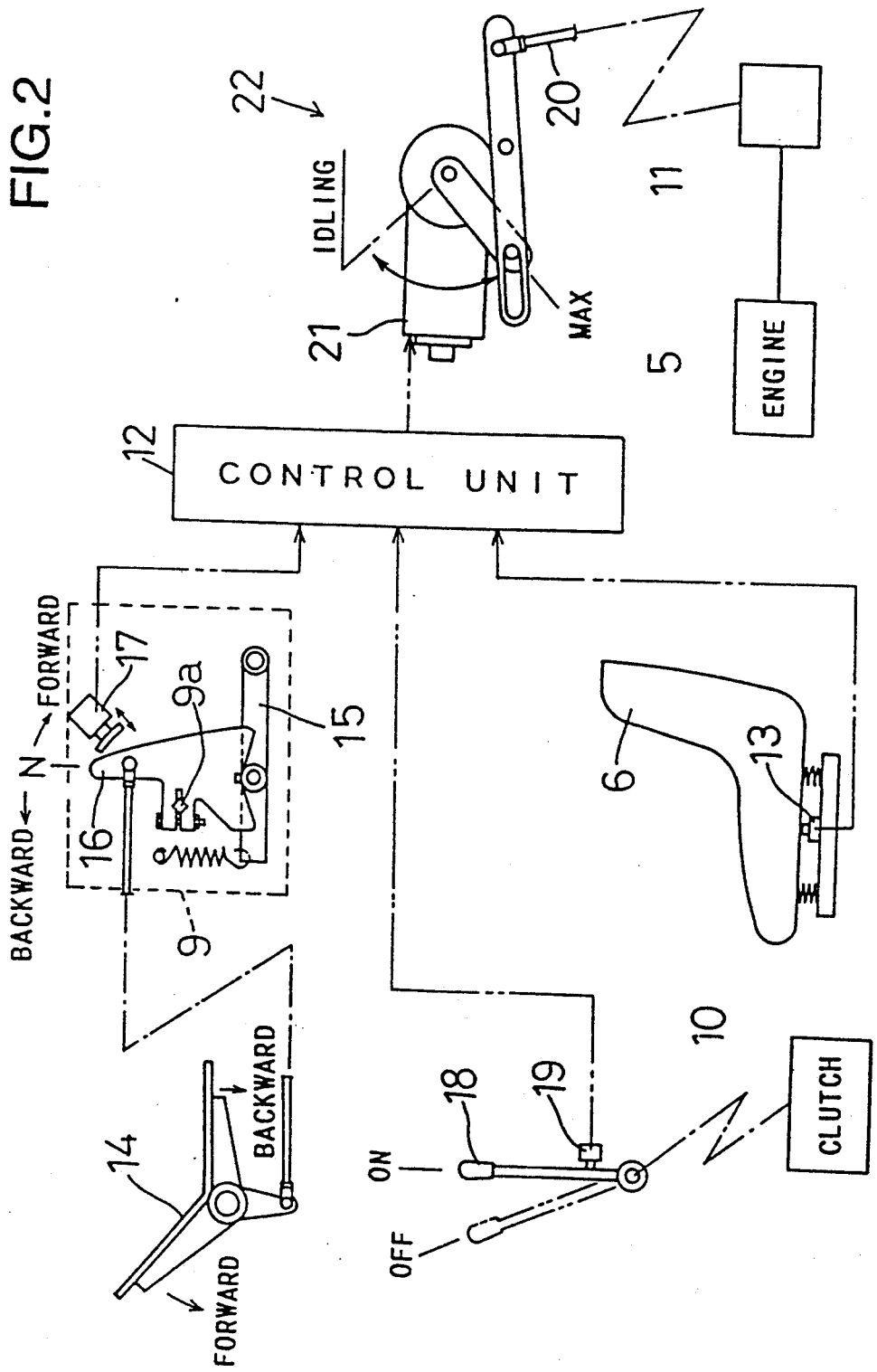
FIG. 2 is a block diagram of the engine speed control system.

FIG. 2 is a block diagram of the engine speed control system according to the present invention. As seen in outline from this figure, the shift pedal 14 is interlocked through a link mechanism to a switch lever 16 attached to a trunnion 9a of the hydrostatic transmission 9. The control system includes a first switch 17 extending into a locus of pivotal movement in a forward direction of the switch lever 16. Numeral 15 denotes a return arm for returning the trunnion 9a to neutral. The control system further includes a second switch 19 for detecting an engaging position of a power takeoff clutch lever 18 interlocked to the power takeoff clutch 10. A control actuator 22 utilizes an electric motor 21 which pushes and pulls a throttle wire 20 connected to the accelerator 11. The first switch 17, second switch 19, motor 21 and pressure sensor 13 are connected to a control unit 12.

The control unit 12 may be formed of a microcomputer system having suitable I/O interfaces. The first switch 17, second switch 19 and pressure sensor 13 are connected to the input interface, while the motor 21 is connected to the output interface through a suitable driver. The motor 21 may be a pulse motor rotatable by a pulse driver to set the accelerator 11 to an idling position and a maximum speed position. Alternatively, the motor 21 may be an ordinary electric motor with two limit switches for establishing the idling position and maximum speed position. Signals of these switches may be applied to the control unit 12 for stopping the motor 21 at the two positions.

Figure 3:
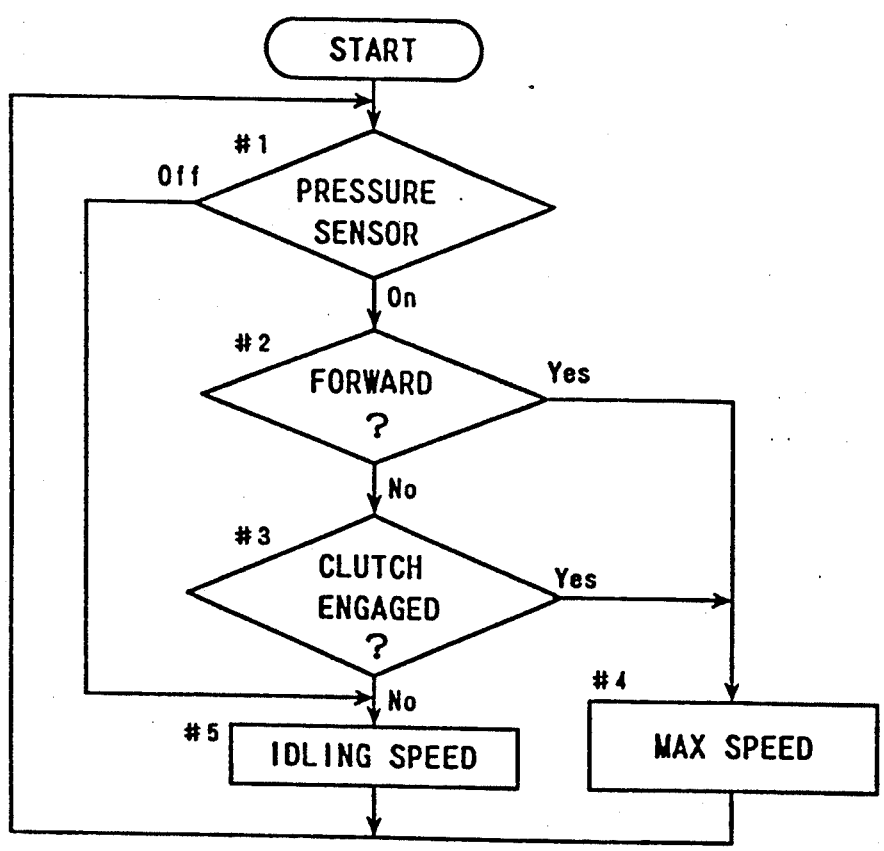
FIG. 3 is a flowchart of a control sequence of the engine speed control system.

The control sequence of this system will be described with reference to the flowchart shown in FIG. 3. If, at step #1, the pressure sensor 13 is in ON state detecting the weight of a seated driver, checking is made at step #2 whether the hydrostatic transmission 9 is in a forward drive position. If the hydrostatic transmission 9 is not in the forward drive position, checking is made at step #3 whether the power takeoff clutch 10 is engaged. If the hydrostatic transmission 9 is in the forward drive position or the power takeoff 10 is engaged, step #4 is executed to output a control signal to the motor 21 for setting the engine 5 to a maximum speed. If the hydrostatic transmission is in neutral or in a backward drive position and the power takeoff clutch 10 is disengaged, step #5 is executed to output a control signal to the motor 21 for setting the engine 5 to an idling speed.

If step #1 finds the pressure sensor 13 in OFF state, power supply to the ignition plug may be cut to stop the engine 5.

The first switch 17 may be modified to operate both in the forward region and backward region. Then the engine 5 may be rotatable at high speed even when the hydrostatic transmission 9 is in the backward drive position.

What is claimed is:

1. An engine speed control system for a working vehicle having an engine, and a propelling transmission and a power takeoff device driven by the engine, said control system comprising:

clutch operation detecting means for detecting an operative state of a power takeoff clutch for operating said power takeoff device;

shift condition detecting means for detecting a shift condition of said propelling transmission;

engine speed adjusting means for adjusting rotating rate of said engine; and control means for receiving detection signals from said clutch operation detecting means and said shift condition detecting means, and outputting control signals to said engine speed adjusting means, said control means outputting a control signal for rotating said engine at an idling speed when said propelling transmission is in neutral and said power takeoff clutch is disengaged, and a control signal for rotating said engine at a high rotating rate when said propelling transmission is in a drive transmitting position or said power takeoff clutch is engaged.

2. A control system as claimed in claim 1, wherein said engine speed adjusting means includes an accelerator for adjusting fuel supply to said engine, and an actuator for externally controlling said accelerator, said actuator being operable a predetermined amount by said control signals.

3. A control system as claimed in claim 1, wherein said power takeoff device includes a mower unit, said power takeoff clutch being operable to control drive transmission from said engine to said mower unit.

4. A control system as claimed in claim 1, further comprising driver detecting means connected to said control means for confirming presence of a driver on a driver's seat, wherein said control means outputs a control signal for forcibly switching said engine to said idling speed when the presence of a driver on said driver's seat is unconfirmed.

5. A control system as claimed in claim 1, wherein said propelling transmission is a stepless transmission having a backward drive region, a neutral position and a forward drive region, said shift condition detecting means outputting to said control means a signal indicating that said stepless transmission is in a drive transmitting position when said stepless transmission is set to said forward drive region.

* * * * *